United States Patent
Candler

(10) Patent No.: US 7,589,738 B2
(45) Date of Patent: Sep. 15, 2009

(54) CACHE MEMORY MANAGEMENT SYSTEM AND METHOD

(75) Inventor: Frederick Christopher Candler, Etobicoke (CA)

(73) Assignee: Integrated Device Technology, inc., San Jose, CA (US)

( * ) Notice: Subject to any disclaimer, the term of this patent is extended or adjusted under 35 U.S.C. 154(b) by 90 days.

(21) Appl. No.: 10/892,559

(22) Filed: Jul. 14, 2004

(65) Prior Publication Data

US 2006/0015686 A1    Jan. 19, 2006

(51) Int. Cl.
G09G 5/36     (2006.01)
G06F 12/02    (2006.01)
G06F 13/00    (2006.01)
G06F 13/28    (2006.01)

(52) U.S. Cl. .................. 345/557; 345/543; 711/119; 711/122

(58) Field of Classification Search ................. 711/119, 711/122; 345/543, 557
See application file for complete search history.

(56) References Cited

U.S. PATENT DOCUMENTS

| | | | |
|---|---|---|---|
| 4,295,193 A | 10/1981 | Pomerene | |
| 4,796,175 A | 1/1989 | Matsuo et al. | |
| 5,043,885 A * | 8/1991 | Robinson | 711/133 |
| 5,249,282 A * | 9/1993 | Segers | 711/122 |
| 5,410,649 A | 4/1995 | Gove | |
| 5,581,725 A * | 12/1996 | Nakayama | 711/122 |
| 6,067,616 A | 5/2000 | Stiles et al. | |
| 6,115,793 A | 9/2000 | Gruber et al. | |
| 6,237,064 B1 * | 5/2001 | Kumar et al. | 711/122 |
| 6,275,899 B1 * | 8/2001 | Savell et al. | 711/118 |
| 6,295,581 B1 | 9/2001 | DeRoo | |
| 6,295,582 B1 | 9/2001 | Spencer | |
| 6,339,428 B1 | 1/2002 | Fowler et al. | |
| 6,353,438 B1 | 3/2002 | Van Hook et al. | |
| 6,433,788 B1 | 8/2002 | Morein | |

(Continued)

FOREIGN PATENT DOCUMENTS

WO    WO 2004/015578 A1    2/2004

OTHER PUBLICATIONS

The following three notices (1)-(3) are PCT notices in the corresponding PCT Application No. PCT/US04/22878.

(Continued)

*Primary Examiner*—Kee M Tung
*Assistant Examiner*—Daniel Washburn
(74) *Attorney, Agent, or Firm*—Sughrue Mion, PLLC

(57) ABSTRACT

A cache memory method and corresponding system for two-dimensional data processing, and in particular, two-dimensional image processing with simultaneous coordinate transformation is disclosed. The method uses a wide and fast primary cache memory (PCM) and a deep secondary cache memory (SCM), each with multiple banks to access data simultaneously. A dedicated pre-fetching logic is used to obtain pixel data from an external memory upon receiving control parameters from an external processor system (PU1), and to store that data in the PCM based on a secondary control queue. The data are then prepared in specific block sizes and in specific format, and then stored in the PCM based on optimally sized pre-fetching primary control queue. The prepared data are then read by another external processor system (PU2) for processing. The cache control logic ensures the coherency of data and control parameters at the input of the PU2.

21 Claims, 5 Drawing Sheets

U.S. PATENT DOCUMENTS

| | | | |
|---|---|---|---|
| 6,449,692 B1 * | 9/2002 | Krueger et al. | 711/122 |
| 6,457,139 B1 * | 9/2002 | D'Errico et al. | 714/5 |
| 6,507,898 B1 * | 1/2003 | Gibson et al. | 711/168 |
| 6,560,674 B1 | 5/2003 | Hosogi et al. | |
| 6,571,315 B2 | 5/2003 | Campbell | |
| 6,629,188 B1 | 9/2003 | Minkin et al. | |
| 6,654,856 B2 | 11/2003 | Frank | |
| 6,658,531 B1 | 12/2003 | Aleksic et al. | |
| 6,681,296 B2 | 1/2004 | Liao et al. | |
| 6,718,440 B2 * | 4/2004 | Maiyuran et al. | 711/137 |
| 6,721,856 B1 | 4/2004 | Arimilli et al. | |
| 6,812,929 B2 | 11/2004 | Lavelle et al. | |
| 6,859,870 B1 * | 2/2005 | Kim et al. | 712/24 |
| 2004/0160441 A1 * | 8/2004 | Lokovic et al. | 345/426 |
| 2004/0260884 A1 * | 12/2004 | Poznanovic et al. | 711/137 |
| 2005/0071701 A1 * | 3/2005 | Luick | 713/320 |

OTHER PUBLICATIONS (1) Notification of Transmittal of the International Search Report or the Declaration.
(2) International Search Report.
(3) Written Opinion of the International Searching Authority.

* cited by examiner

CACHE MEMORY MANAGEMENT SYSTEM AND METHOD

FIELD OF THE INVENTION

The present invention relates to cache memory structure and management in digital data processing, and particularly, in digital image data processing.

BACKGROUND OF THE INVENTION

Since the invention of new computer systems, there has always been a race for faster processing and faster systems. Faster processors have been created with exponential growth in clock speed. Naturally, the volume of data and instructions has gone up quite rapidly too. In a computer system, there are storage devices such as ROM (read-only memory), and burst based storage devices, e.g. DRAM, for data and instruction storage with increasingly higher capacities. Structurally, large memory spaces are deep, and they could slow down the processor access to data and instructions in the memory. This problem has created a need for a more efficient memory management and the creation of cache memory and cache memory structure. A cache memory is generally a shallow and wide storage device, inside or close to a processor that facilitates processor's access to the data and content change of the data. The philosophy of cache memory management is to retain copies of data and instructions which are often used, or are most likely to be used in near future by the processor, inside the fastest accessible storage device. This makes the access of a processor to data and instructions many times faster than to otherwise access them in an external memory. However, care must be taken in such operations as changing content in cache memory and in external memory should be harmonized. These issues, with their hardware and software features, have created the art of cache memory structure and management.

As mentioned, a cache memory keeps copies of data and address pointers that are most likely to be accessed next by the processor. An external memory typically holds data in capacitors and needs refresh cycles to replenish the charge on the capacitors to prevent the loss of data. A typical cache memory, however, uses eight transistors to represent one bit, and as such, does not need refresh cycles. A cache memory therefore has much less storage space than an external memory per unit size. Accordingly a cache memory can contain much less data than an external memory. As a result, data and instructions must be selected carefully to optimize cache operations.

Different policies and protocols are used to optimize cache memory operation. Most well known among these are direct mapping, fully associative, and set-associative. These protocols are known to people skilled in the art. They serve the general purposes of computing, including data processing, web based applications, etc. U.S. Pat. No. 4,295,193 to Pomerene presents a computing machine for concurrently executing instructions compiled into multi-instruction word. It is one of the earliest patents alluding to cache memory, address generators, instruction registers, and pipelining. U.S. Pat. No. 4,796,175 to Matsuo presents a microprocessor with instruction queue for pre-fetching instruction form a main memory and an instruction cache. U.S. Pat. No. 6,067,616 to Stiles presents a branch prediction cache (BPC) scheme with hybrid cache structure, a fully associative wide and shallow first level BCP, a second deep and narrow direct mapped level BCP with partial prediction information. U.S. Pat. No. 6,654,856 to Frank presents a cache management system in a computer system, wherein, an addresswise circular structure of the cache memory is emphasized.

U.S. Pat. No. 6,681,296 to Liao presents a microprocessor with a control unit and a cache, which is selectively configurable as single or partitioned with locked and normal portions. U.S. Pat. No. 6,721,856 to Arimilli presents a cache with coherency state and system controller information of each line with different subentries for different processors containing a processor access sequence. U.S. Pat. No. 6,629,188 discloses a cache memory with a first and a second plurality of storage spaces. U.S. Pat. No. 6,295,582 discloses a cache system with data coherency and avoiding deadlock with substantially sequential read and write commands. U.S. Pat. No. 6,339,428 discloses a cache apparatus in video graphics where compressed texture information are received and decompressed for texture operations. U.S. Pat. No. 6,353,438 discloses a cache organization with multiple tiles of texture image data and directly mapping of data into cache.

Each of the above inventions offers certain advantages. An efficient cache structure and policy depends strongly on the specific application at hand. In digital video applications, digital image processing in real time and with high quality is one of the great challenges of the field. Specifically one needs to perform detailed two-dimensional image processing with simultaneous nonlinear coordinate transformations. A dedicated and specialized system is therefore needed with unique advantages providing fast access with data coherency. Accordingly it is necessary to optimize the cache structure and cache management policy for this application.

SUMMARY OF THE INVENTION

The present invention in one aspect provides a method for cache memory management and structure in digital data processing, and in particular, in digital image processing in a setting consisting of:
   (a) an external memory where data to be accessed and processed are stored;
   (b) a plurality of processor units (PU1) issuing control commands and generating control parameters and memory addresses of data to be processed in said external memory;
   (c) a plurality of processor units (PU2) to process the data.
The method uses the following cache structure:
   (i) a deeper secondary cache memory (SCM) with higher storage capacity, having a plurality of banks and each bank having a plurality of storage lines, to read data from said external memory;
   (ii) a faster and wider primary cache memory (PCM) with lower storage capacity, having a plurality of banks and each bank having a plurality of storage lines, from where data are read by said PU2; and
   (iii) a control logic containing control stages and control queues, providing pre-fetching and cache coherency;
   to access data in the external memory, upon receiving address sequences and control parameters form the PU1, and to prepare data for fast access and processing by the PU2. The method achieves cache coherency and hides memory read latency via:
      (a) identifying data blocks to be processed in the external memory based on the topology and structure of the processing operation in the PU2;
      (b) generating sufficiently large SCM control queues based on the results of (a) and determining whether the data are present in the PCM, in order for the SCM to access data in the external memory sufficiently earlier than they are needed for processing by the PU2;

(c) reading a block of input data from multiple banks of said SCM simultaneously in a preset number of clock cycles and abstracting said external memory data organization from the cache data organization by uncompressing and reformatting the data to hide the external data organization from said PU2 to speed up data processing in said PU2;

(d) generating sufficiently large PCM control queues based on the results of (a) and (b) to store abstracted data in said PCM in advance of the data being required by said PU2; and (e) synchronizing the arrival of data and control parameters in said PU2 to achieve cache coherency.

In another aspect, the present invention provides a cache system based on the method just described.

Further details of different aspects and advantages of the embodiments of the invention will be revealed in the following description along with the accompanying drawings.

DETAILED DESCRIPTION OF THE INVENTION

We now explain the invention in detail according to the accompanying drawings and exemplary implementations. The present invention relates to cache structure and management. The implemented example, given in this description, is that of image processing with simultaneous coordinate transformation. However, people who are familiar with the art could appreciate that the scope of the invention is not limited to this particular example. It relates to any type of digital data processing in which, a plurality of processors attempt to fetch data and control parameters from an external memory and other processors with an arbitrary format. In particular, two-dimensional (2D) image transformation example, given here, could be trivially replaced by any 2D data transformation without departing from the scope of the present invention. Accordingly, in the following, we refer to data as image pixel data. We refer to the plurality of processors which issue control parameters regarding the structure and topology of input data as the geometry engine. In addition, we refer to the plurality of processors accessing data for operation as filter engine, and the corresponding operations as filtering.

Figure 1:
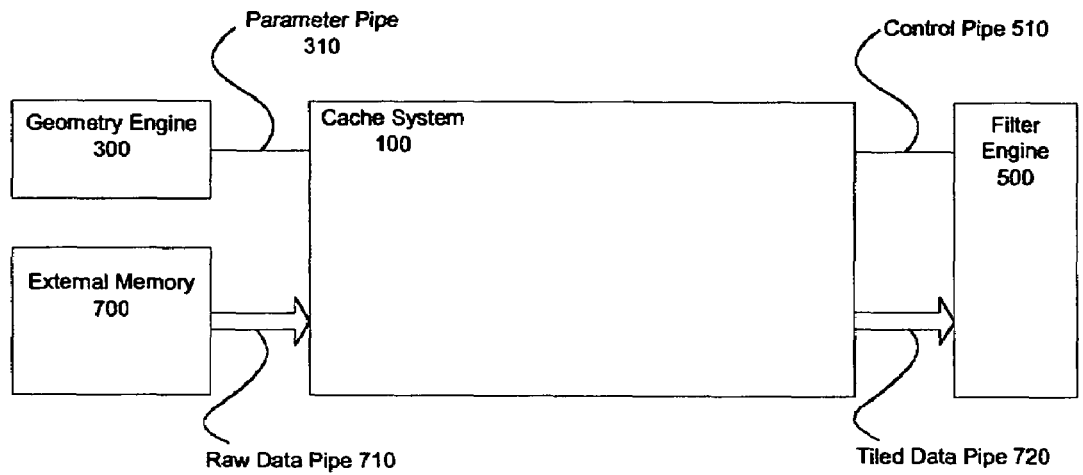
FIG. 1 represents an overall scheme of a cache system built in accordance with the present invention.

Built in accordance with the present invention FIG. 1 is an illustrated example of the setting of cache system 100 in a computing arrangement, designed for digital image data processing, with simultaneous coordinate transformation. Cache system 100 interfaces with two sets of processors. The first plurality of processors, in this example implementation, constitute geometry engine 300 and the second plurality of processors constitute filter engine 500. In addition to these two engines, cache system 100 interfaces with external memory 700, which could be any memory with access latency. Cache system 100 receives control parameters including coordinate transformation as well as filter footprint parameters from geometry engine 300. It simultaneously receives pixel data from external memory 700. Cache system 100 provides these data to the filter engine 500 in a manner as to optimize the filtering process with minimal stalling of filter engine 500.

In two-dimensional (2D) data processing, and in particular, digital image data processing, a comprehensive filtering or sampling function is needed. In the following, we take on the particular example of 2D image processing; hence the word "pixel" is used as a particular case for arbitrary 2D data. In 2D digital image processing, each output pixel is formed based on information from many input pixels. First, the output pixel coordinates are mapped onto input pixel coordinates. This is a coordinate transformation, normally achieved electronically via image warping techniques. Once the center input pixel is determined, a filtering or sampling function is needed to generate output pixel specifications, namely, intensities of the constituent colors, and other information such as sampling format and blending function. The area containing all the pixels around the central input pixel, over which the sampling is performed, is called the filter footprint. It is well known in the art that the size and shape of the filter footprint affect the quality of the output image.

The function of cache system 100 is to use a dedicated architecture and pre-fetching logic to provide enough random access pixel data and control parameters to filter engine 500 so it has data to process at any given clock rate with minimal stalling. With an optimally sized read request queue, cache system 100 is able to hide the majority of the memory read latency inherent in external memory 700, from where the pixel data are fetched. This hiding of the memory read latency is paramount to the filter performance. If the latency is not hidden properly, filter engine 500 will not have maximized throughput. The amount of allowable stalling is a design parameters. One needs to adjust different parameters to achieve required throughput as a tradeoff with hardware cost.

In addition, cache system 100 provides a control path for the coordinate transformation and filter footprint parameters, read from geometry engine 300. Cache system 100 ensures that the pixel data from external memory 700 on the one hand, and control parameters from geometry engine 300 on the other hand, are synchronized when they arrive at the input to filter engine 500.

In this disclosure, we adopt the convention of representing quantities (e.g. 64 bytes) in italic letters to be distinguished from reference numbers (e.g. filter engine 500).

Figure 2:
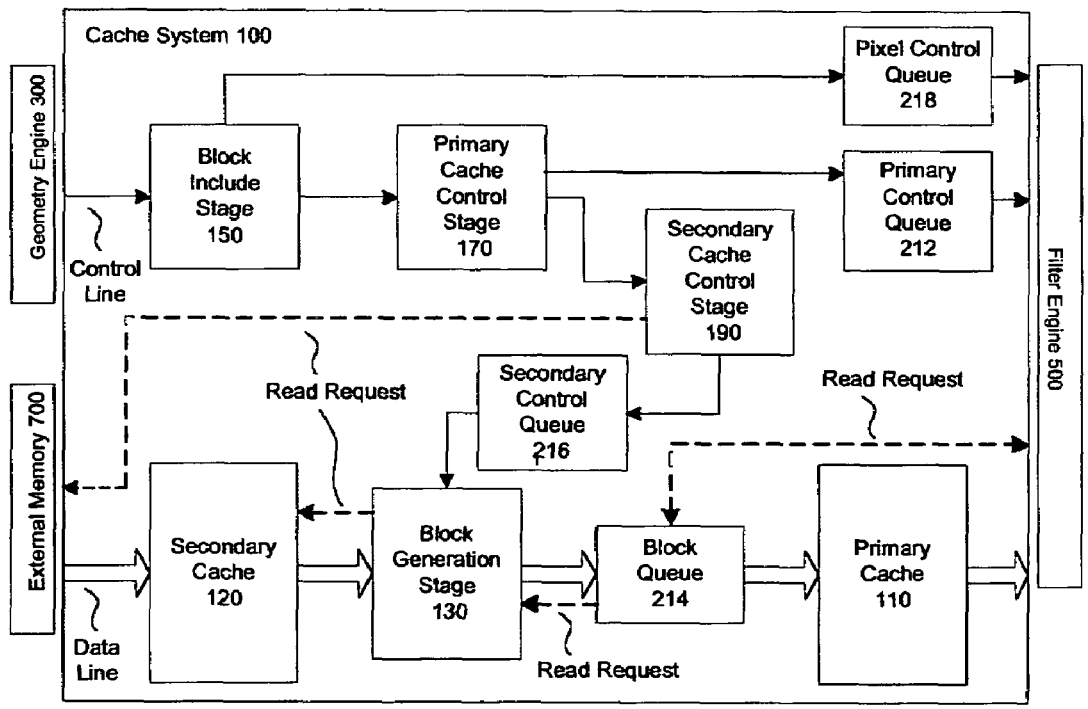
FIG. 2 represents the detailed structure of a cache system built in accordance with the present invention.

FIG. 2 is an illustrated example of the detailed structure of cache system 100. For each output pixel, cache system 100 receives certain control parameters from geometry engine 300. These parameters include the coordinates of the mapped input pixel, U and V, and additional control parameters, including those defining the shape, rotation, and size of the filter footprint. Simultaneously, cache system 100 receives pixel data for each of the pixels included in the filter footprint from external memory 700. These data include the intensity levels of constituent colors in color space, e.g. RGB or YCrCb, sampling format, e.g. 4:4:4 or 4:2:2, and blending function, i.e. with α or without α.

Figure 3:
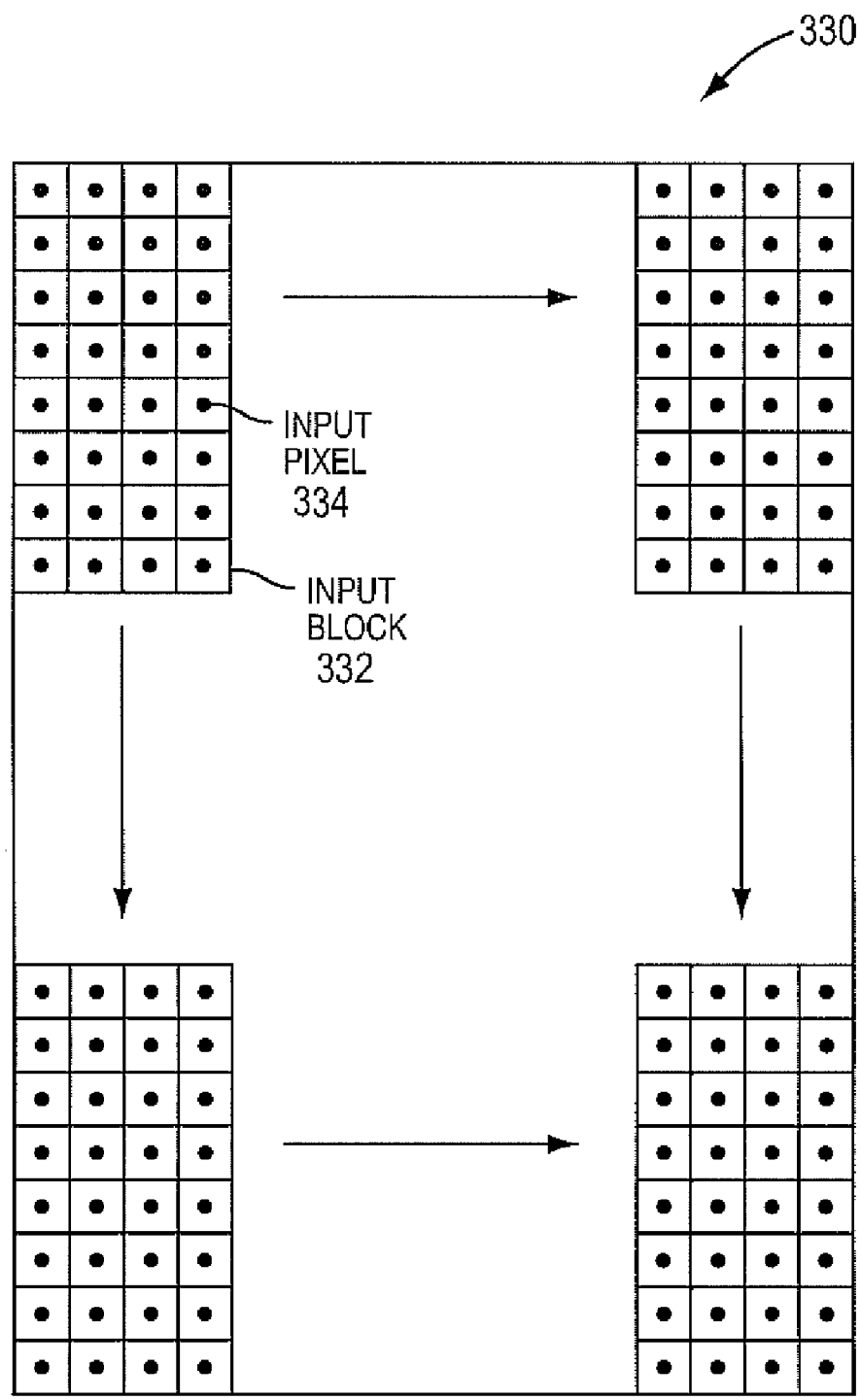
FIG. 3 represents an example of the block structure of the input data to be cached.

The structure of cache system 100 is related to dividing the input image into blocks of size m×n pixels. FIG. 3 shows a particular example of an input image pixel block structure, in which, n=8 and m=4. Input image 330 comprises a certain number of pixels, for instance, 1024×1024, grouped into blocks. Each input pixel block 332 contains m×n input pixels 334. The structure of blocks is in general a function of footprint shape and size in different filtering schemes.

Cache system 100 fetches data relating to m×n input pixel blocks 332 and generates data blocks usable by filter engine 500. As such, the system has to determine which blocks fall inside the footprint and which pixels inside these blocks must be included for filtering. The structure of cache system 100 is scalable to match the input block data structure. It should also be noted that in general the structure of cache system 100 is a function of the nature and structure of the operation of filter engine 500. In the particular case of image processing, the structure and topology of the operation are defined partially by the filter footprint.

Referring now to the illustrated example of FIG. 2, cache system 100 comprises primary cache 110 which is shallow and wide with lower capacity, secondary cache 120 which is deep with higher capacity, block inclusion stage 150, block data generation stage 130, primary cache control stage 170, and secondary cache control stage 190. There are also a number of queues, which will be explained later in this disclosure. The pixel data are first read into secondary cache 120 from external memory 700. Then these data are reformatted and uncompressed by block generation stage 130 for use by filter engine 500. These reformatted data are put into a queue to be placed in primary cache 110 at the appropriate time, where they are readily accessible by filter engine 500. Below we explain the data path and the control logic structure respectively.

Figure 5:
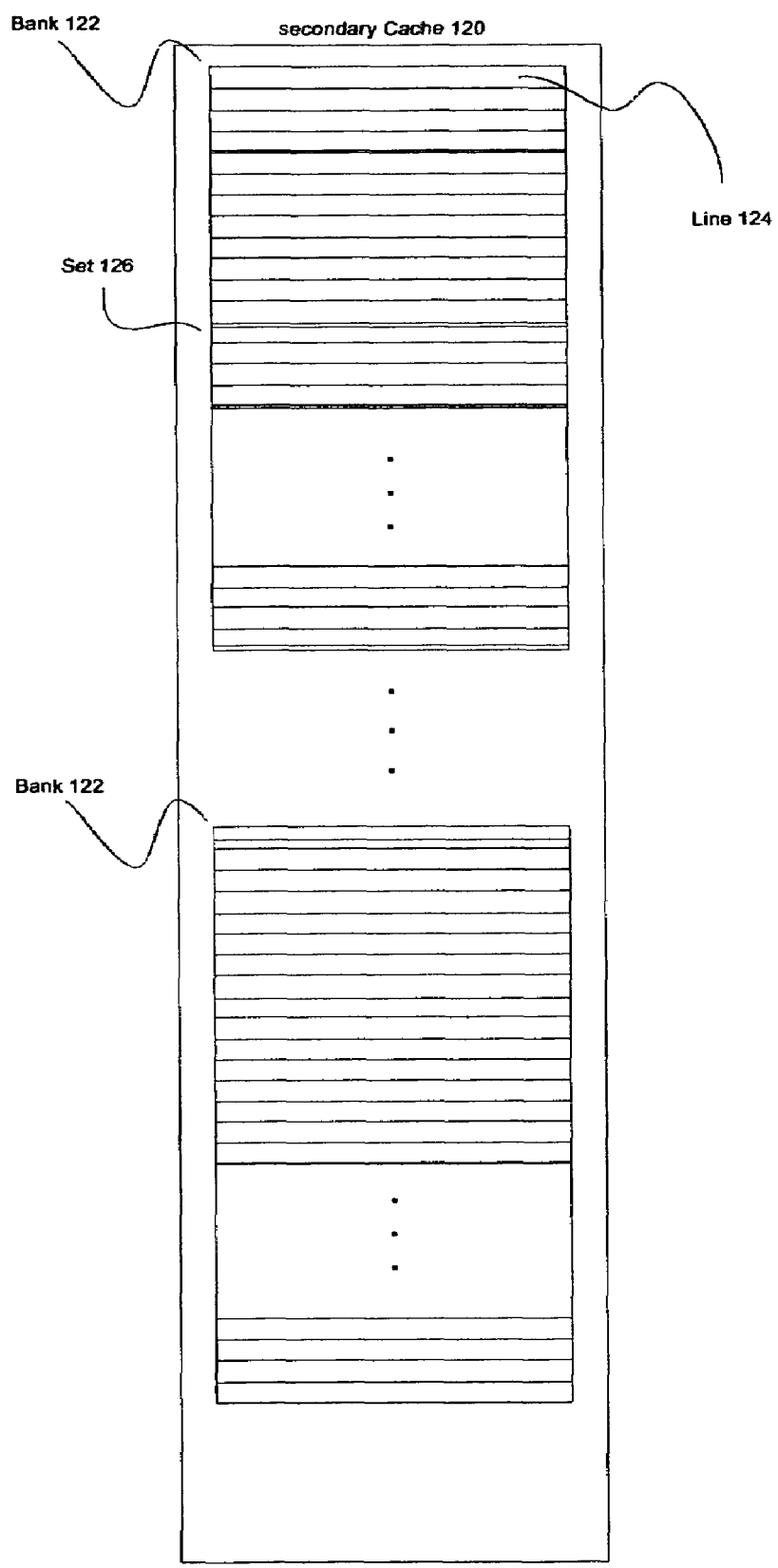
FIG. 5 represents the general structure of the secondary cache system built according to the present invention.

Referring now to the illustrated example of FIG. 5, secondary cache 120 is a higher capacity storage device that reads raw data from external memory 700. The pixel data in external memory 700 are stored in an arbitrary format, generally not well suited for processing in filter engine 500, for instance, in a particular example, the data are stored sequentially, in scan-line order. Secondary cache 120 is designed to read these data efficiently with minimal interruption.

Each line in the secondary cache is designed to accommodate a burst of $b_2$ bytes of data from external memory 700. For this reason, each line in secondary cache 120 is sized according to the structure of the external memory 700 and the read requirements. The number of lines in secondary cache 120, in which the data are stored, is also a design parameter optimized to reduce the secondary cache miss count. Secondary cache 120 is additionally banked to allow a read throughput sufficient to update primary cache 110 to minimize the stalling of filter engine 500. These design parameters are crucial in order to store enough data for pixel processing by filter engine 500 since many adjacent pixels are needed for sampling a central input pixel.

Accordingly secondary cache 120 is designed to have a certain number of banks with independent access lines to read data from external memory 700 simultaneously. As shown in the illustrated example of FIG. 5, secondary cache 120 has a number of banks 122, each with a certain number of lines 124. Each secondary cache line contains data from one data burst read from external memory 700. These data need to be eventually read by filter engine 500. As such, the number of secondary cache banks is designed as a function of the data throughput. For an m×n input block structure and a required number of clock cycles, $N_C$, to read the data, $n/N_C$ banks are needed in secondary cache 120. To distribute data amongst secondary cache banks, in one particular implementation, the combination of U and V least significant bits (LSBs) is used. This reduces the complexity of the decoding logic, which saves area and makes the update much faster. To divide each bank into $2^i$ partitions, i LSBs are used. If there are $2^i$ lines per secondary cache bank 122, this will make the secondary cache architecture $2^i/2^i$ set-associative. This design along with proper replacement policy for secondary cache 120, which will be explained later along with the cache logic, yield a simple and efficient division to distribute the data across secondary cache 120.

Once the data are read from external memory 700 into secondary cache 120, these data need to be converted into a format usable by filter engine 500. Block generation stage 130 reads data in secondary cache 120 and prepares these data in blocks that include all the data from an m×n input pixel block. As described above, block generation stage 130 reads from $n/N_C$ lines of secondary cache 120 per clock cycle. This ensures that in each $N_C$ clock cycles, all the data relating to one input pixel block are read simultaneously. Depending on the packing format of the data and throughput requirements, multiple reads may be required from secondary cache 120 to generate the input pixel block. In addition to reading these data, block generation stage 130 is adapted to reformat and uncompress these data into a format readily usable by filter engine 500. Block generation stage 130 therefore hides the original pixel data format, which could be compressed with various compression schemes. This exonerates filter engine 500 from figuring out the format of the pixel data in external memory 700 and unpacking the original formatted data into blocks that are usable for filtering. These block data are eventually stored in primary cache 110, from where they are read by filter engine 500.

Figure 4:
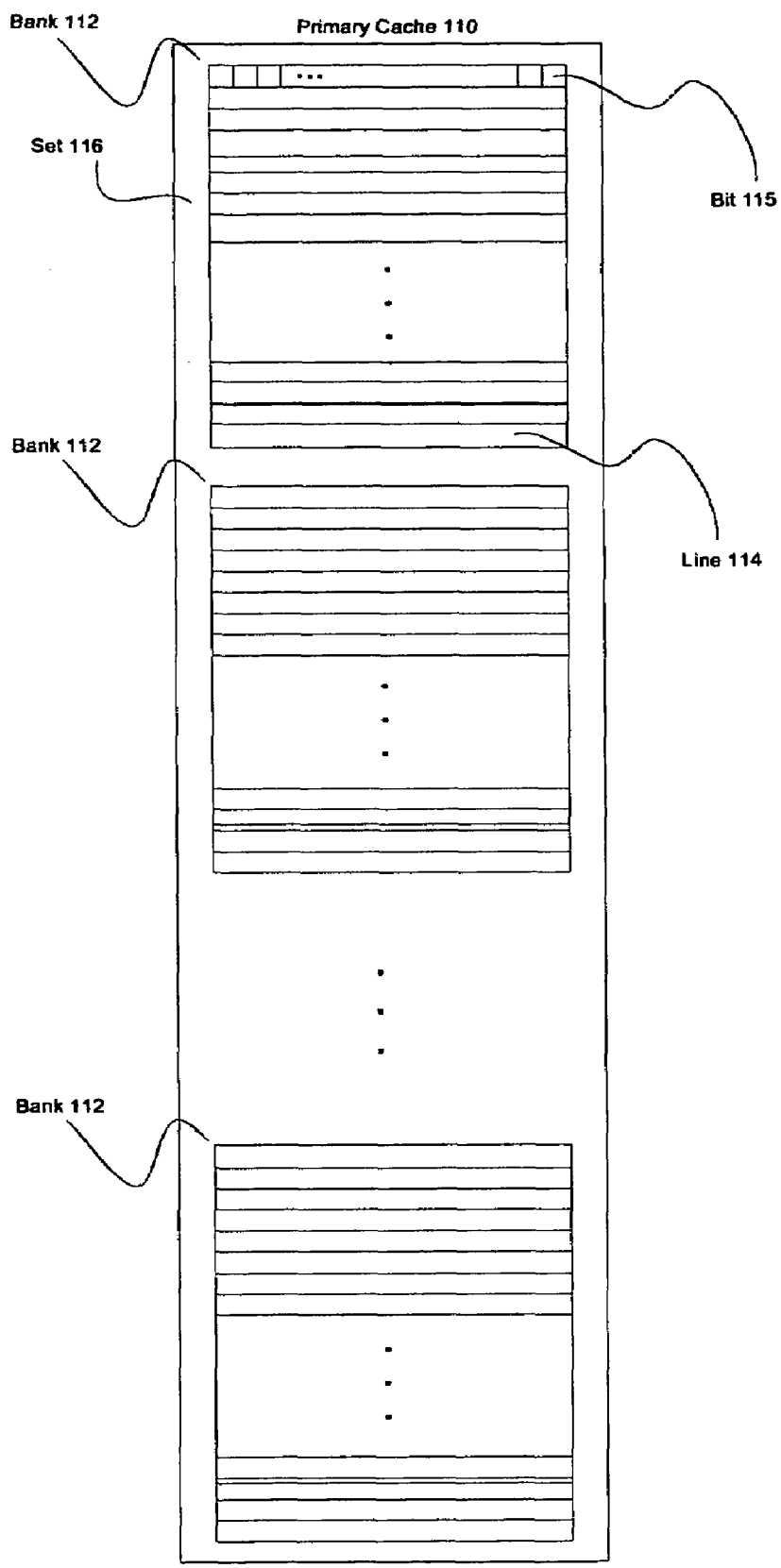
FIG. 4 represents the general structure of the primary cache system built according to the present invention.

Referring now to the illustrated example of FIG. 4, primary cache 110 is designed in a fashion to optimize the rate of data access in filter engine 500. As such, it has a shallow but wide structure for multiple lines of access. Primary cache 110 is divided into a certain number of banks, with each primary cache bank 112 being read independently and simultaneously by filter engine 500. The number of primary cache banks is determined according to empirical data and simulation to optimize filtering performance. Each primary cache bank 112 contains a certain number of primary cache lines. Each primary cache line 114 contains data from an entire m×n block of input data. As such, for $b_1$ primary cache banks, filter engine 500 reads data containing $b_1$ input blocks per cycle in proper format. This is crucial since for sampling, many input blocks around an input pixel are needed and if they are not provided to filter engine 500, it will stall. The amount and frequency of stalling determine the throughput performance.

To distribute data in different primary cache banks, the LSBs of input pixel coordinates, U and V, are used. Each primary bank 112, inside primary cache 110, is also divided into a certain number of partitions. As explained above, a certain number of LSBs are used to distribute the data amongst different primary cache banks. In the remaining bits of the input pixel U and V addresses, further LSBs are used again to distribute data in each primary cache bank 112. For $2^f$ lines per primary cache bank and g LSBs used to partition each bank, this division yields a $2^f/2^g$ set-associative architecture.

This design is again used along with proper replacement policy for primary cache 110, which will be explained later, to achieve optimal throughput. This architecture is scalable in a simple and natural way since for larger input data volume more bits are available in the U and V addresses.

Figure 6:
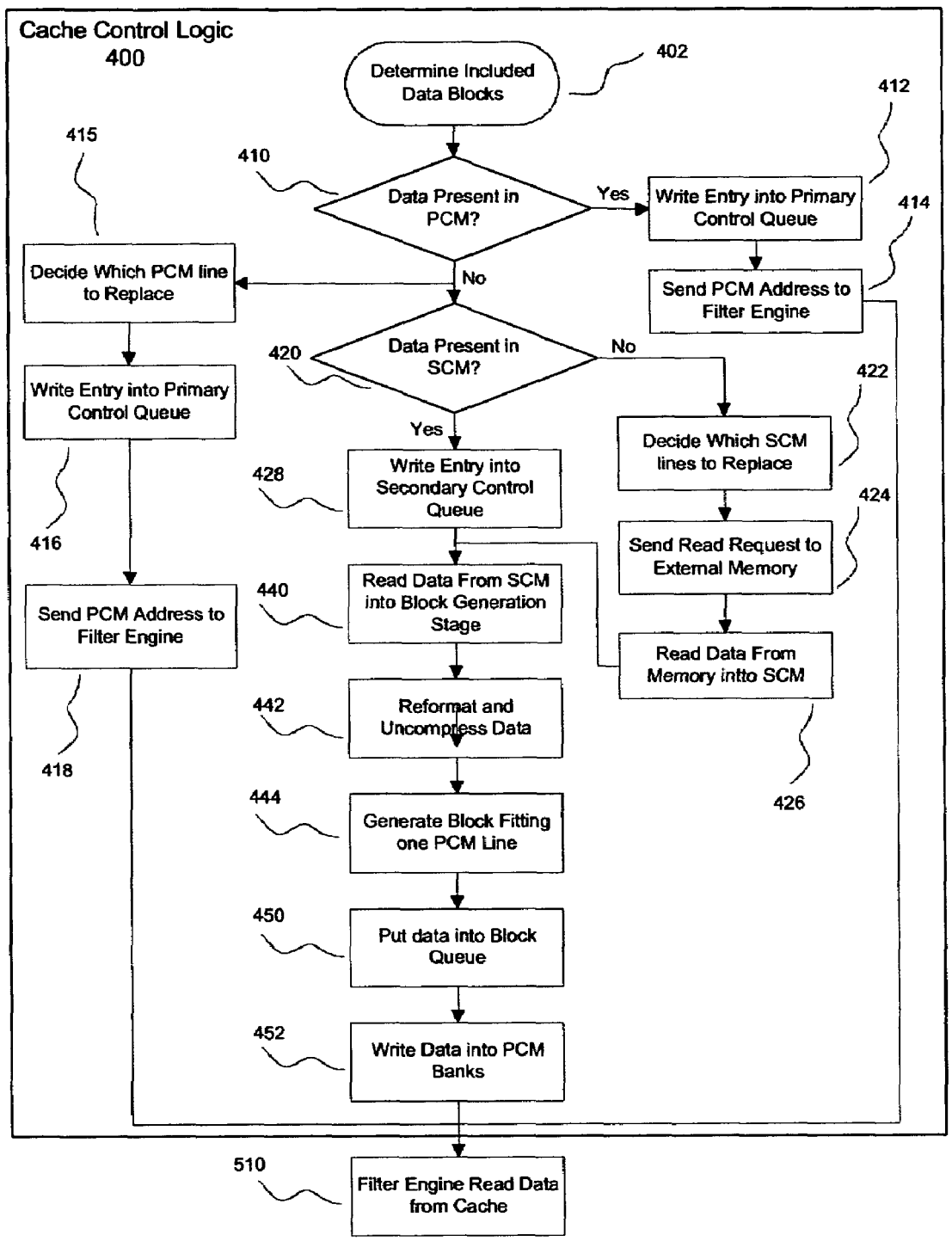
FIG. 6 represents the flow logic of a cache system built according to the present invention.

To ensure the presence of data in usable format, when needed by filter engine 500, a pre-fetching logic structure is designed. FIG. 6 represents cache control logic 400. This logic structure controls reading data from external memory 700 by secondary cache 120, reading and reformatting data in block generation stage 130, and data block storage in primary cache 110.

At step 402, it is determined which blocks of data are necessary for sampling based on control parameters received from geometry engine 300. Once the data are identified, at step 410 it is determined whether these data are present inside the primary cache. If present, an entry is written to primary control queue at step 412 and the address of these data is sent to the filter engine at step 414. If the data are not present in the primary cache, at step 415, according to an adopted replacement policy explained later, it is determined which primary cache line to replace. Then the address of this primary cache line is written to the primary control queue at step 416 and sent to the filter engine at step 418. It is then determined whether these data are present in the secondary cache at step 420. If the data are not present there either, it is decided at step 422 which secondary cache lines to replace. Then a read request is sent to the external memory to fetch the data that are later read into the secondary cache at step 426. If the data are present in the secondary cache, an entry is written into secondary cache control queue at step 428.

In both cases, a secondary cache hit, or a secondary cache miss after the data are fetched from the external memory, secondary cache data are read for block generation at step 440. Here the data are read from multiple secondary cache banks and are reformatted and uncompressed at step 442. At this stage, at step 450, a block of input data in the proper format is sent into a queue to be stored in the primary cache. These data are stored in primary cache banks at step 452.

The update of primary cache 110 occurs when the associated control data is read from primary control queue 212 and pixel control queue 218. This ensures that cache coherency is maintained inside primary cache 100. At this point data from the primary cache along with control parameters coherently arrive at the filter engine input at step 510.

The pre-fetching logic is designed to hide the read latency in filter engine 500. Without this control logic structure, data throughput will not be optimal and filter engine 500 will have a higher rate of stalling. With sufficiently sized queues, optimal storage sizes, data preparation, and intelligent replacement policy, cache system 100 hides most of the read latency by running ahead of filter engine 500.

Referring back to FIG. 2, we now explain the hardware implementation of the cache control logic 400. Block inclusion stage 150 is the starting point of the control logic. For each output pixel, it receives control parameters from geometry engine 300, including coordinates of the mapped input pixel and the shape of the filter footprint. Based upon the input pixel coordinates, U and V, the footprint shape, and other control parameters, the block inclusion logic determines which input blocks are required for processing each output pixel and which pixels in each block are required for sampling.

Block inclusion stage 150, in one example of the present invention, compares the coordinate positions of adjacent blocks with the geometry of the footprint to include blocks of pixels necessary for sampling. The block inclusion logic generates k blocks per clock cycle with each block differing in at least 1 U or 1 V least significant bit (LSB) in its block address. This guarantees that k combinations of LSB's will be present in each set of blocks generated by the block inclusion logic. This constraint is used to distribute the blocks amongst the primary cache banks. The number of generated blocks per clock cycle, k, is a function of the footprint size, and the topology of the blocks is a function of the footprint shape. These parameters should be considered in the design of cache system 110 with respect to the data processing in filter engine 500 through careful simulation and experimentation. Pixel control queue 218, generated by block inclusion stage 150, is sent to filter engine 500 in advance to allow filter engine 500 to generate the scaling parameters ahead of actual pixel data.

Primary cache control stage 170 provides control logic for data handling in primary cache 110. For each input block determined by block inclusion stage 150, primary cache control 170 checks to see if the block is present in primary cache 110. If the data is present, this is termed a cache hit. Else a cache miss is registered and the miss flag is sent to secondary cache control 190. Primary cache control stage 170 writes an entry into primary control queue 212, indicating the address of the data inside the primary cache 110, as well as whether there has been a primary cache hit or miss. Primary control queue 212 is read by filter engine 500 on a FIFO basis. If a cache-miss flag is raised in one of the entries, filter engine 500 sends a read request to block queue 214 which will update primary cache 110.

In the case of a primary cache miss, occurring when the data block is not present in primary cache 110, when either the U or V addresses do not match any of the blocks that are checked, or the associated valid bit is not set, the event is termed a primary cache miss. The control logic in secondary cache control stage 190, upon receiving a primary cache miss flag, will determine which steps to take to generate the m×n block that will be written into the primary cache. Secondary cache control stage 190 first determines whether the data exist in the secondary cache 120. This will yield a secondary cache hit or a secondary cache miss. If a secondary cache miss occurs, secondary cache control 190 sends a read request to external memory 700 to fetch the missing data into secondary cache 120 from external memory 700 and writes an entry into secondary control queue 216. If a secondary cache hit occurs, secondary cache control stage 190 does not send a read request and only writes an entry into secondary control queue 216, where entries are read by block generation stage 130 on a FIFO basis.

Upon receiving each queue entry, block generation stage 130 reads raw data relating to an entire input block from secondary cache 120. These data are then reformatted in block generation stage 130 into a format readily usable by filter engine 500. Depending on data packing mode, multiple secondary cache lines maybe required to generate a primary cache line 114. After obtaining all the data relating to one input block and reformatting these data, block generation stage 130 writes an entry into block queue 214. Each block queue entry therefore contains all the data from the entire input block in proper format. Block queue entries are then received by primary cache 110, where they are stored to be readily accessed by filter engine 500. Accordingly, block queue 214 allows secondary cache 120 to run ahead of filter engine 500.

It should be noted that the function of cache system 100 is based on coherency of pixel data and control parameters in addition to the dedicated pre-fetching logic. No data are read by the secondary cache 120 without a request from secondary cache control stage 190. Once that data are in secondary cache, only entries in secondary control queue 216 determine whether these data are needed for block generation in block generation stage 130. Once a block of data is generated, they are put in a queue to be stored in primary cache 110 only upon a read request from filter engine 500, which is itself instigated by an entry in primary control queue 212. Moreover, filter engine waits for the arrival of both pixel data as well as control parameters from two independent queues before processing the data.

Depending on the relative size of the filter footprint and the cache storage space, it maybe necessary to divide the footprint into sub-footprint portions and to process data in each sub-footprint sequentially. This measure is foreseen in the design of cache system 100 for dynamically sized footprints. Once the data relating to each sub-footprint is cached, the filter engine will process these data sequentially.

To appreciate the effect of data pre-fetching to allow cache system 100 to hide the memory read latency, it has been benchmarked, in one example of the present invention, that the read latency was on the order of 128 clock cycles. By providing sufficiently large queues, nearly all the latency is hidden. The size of the queues in the present invention can be adjusted to match the memory read latency seen in the system and, as such, they are scalable design parameters based upon the system specifications.

Once the cache logic structure determines that a certain block of data should be read by secondary cache 120 or prepared for storage in primary cache 110, a replacement policy is needed. One existing primary cache line 114 or multiple secondary cache lines 124 will have to be replaced. In one example of the present invention, the cache replacement policy is distance based. According to the U and V input block addresses, primary cache control stage 170 and secondary cache control stage 190 compare the central input pixel U and V coordinates with those of the existing block data in the cache lines. The entry with the largest distance from the central input pixel is then replaced. This policy stems from the fact that the closer the distance to the central pixel, the higher the probability of being needed for sampling calculations.

In another example of the present invention, the cache replacement policy is least-recently-used (LRU) based. In this latter example, primary cache control stage 170 and secondary cache control stage 190 opt to replace the cache lines that are least recently used.

The design of cache system 100 has a few measures to make sure this system is scalable. The size of secondary cache lines is scalable to the memory read size, e.g. burst size, from external memory 700 and the block generation rate. The number of secondary cache lines is scalable based on the required cache efficiency. The number of secondary cache banks is scalable based upon the input block data structure and the number of clock cycles per access out of the secondary cache. Scaling secondary cache 120 is based on size requirements and the cache system efficiency, i.e., the amount of input digital data to be reread.

The number of blocks generated per clock cycle in block inclusion stage 150 is scalable based on filtering algorithm and footprint size and required throughput. The partitioning of primary cache 110 and secondary cache 120, based on the U and V input pixels LSBs is adaptable to the size of the cache. This is implemented by the number of bits used for a particular partitioning. The size of primary cache lines is scalable based on input block size. The number of primary cache banks is scalable based on filtering throughput. The sizes of different queues are also scalable parameters depending on memory latency vs. the required throughput. These sizes are determined based on simulations and empirical data.

All these design parameters must be carefully considered as tradeoffs between cost and performance. Careful simulations and experimentation are accordingly done for particular implementation of this invention to optimize a cache solution for a particular case at hand.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A cache system in digital data processing, and in particular, two-dimensional image processing at a required throughput with simultaneous coordinate transformation for video processing applications, in an arrangement consisting of:
    (a) an external memory where data to be accessed and processed are stored, said external memory having a read format;
    (b) at least one processor unit (PU1) issuing control commands and generating control parameters and memory addresses of data to be processed in said external memory;
    (c) at least one processor unit (PU2) to process the data;
    said system comprising a primary cache memory (PCM), a secondary cache memory (SCM), and a control logic, wherein:
        (i) the SCM is deeper and has a higher storage capacity than the PCM to efficiently access data from said external memory, and further has a plurality of banks and each bank has a plurality of storage lines wherein the sizes and numbers of and storage lines are optimized based on an input block data structure, and the required thoughput, and the number of secondary cache banks is designed as a function of the data throughput such that, for an m×n structure of data and a required number of clock cycles $N_c$ to read the data, the secondary cache has $n/N_c$ banks;
        (ii) the PCM is faster and wider and has a lower storage capacity than the SCM for fast data access in said PU2, and further has a plurality of banks and each bank has a plurality of storage lines, wherein the sizes and numbers of the banks and storage lines are optimized based on an input block data structure, the read format from the external memory, and the required throughput;
        (iii) the control logic contains control stages and control queues, providing pre-fetching and cache coherency upon receiving address sequences and control parameters from said PU1;
            wherein, said system is adapted to achieve cache coherency and hide memory read latency via identifying all data blocks in said external memory and issuing only the data reads required to fetch the data for processing based on the topology and structure of the processing operation and pre-fetching said data blocks for processing by said PU2.

2. The system of claim 1, wherein, mapping to the cache system is a direct mapping based on address sequences.

3. The system of claim 1, wherein, mapping to the cache system is done in two stages of:
    (a) direct mapping based upon the address sequences; and
    (b) distance based replacement policy, wherein, data relating to an input block farthest from the data block being processed is replaced.

4. The system of claim 1, wherein, mapping to the cache system is done in two stages of:
    (a) direct mapping based upon the address sequences; and
    (b) least-recently-used based replacement policy, wherein, data relating to input blocks least recently used are replaced.

5. The system of claim 1, further adapted to scale said PCM size at design stage based on approximate volume of the data expected to be accessed, where the exact volume of the data during process time is adjusted to PCM size.

6. The system of claim 1, further adapted to scale said SCM size at design stage based on approximate volume of the data expected to be accessed, where the exact volume of the data during process time is adjusted to SCM size.

7. The system of claim 1, further adapted to scale said PCM line size at design stage based on the expected cache update frequency.

8. The system of claim 1, further adapted to scale said SCM size at design stage based upon the amount of input digital data expected to be reread and further adjusting the amount of the data to be reread to SCM size.

9. The system of claim 1, further adapted to divide the input data block into sub-blocks and sequentially caching the data from each sub-block for processing in said PU2.

10. The system of claim 1, further adapted to scale the depth of the control queues and data queues at design stage to optimize throughput.

11. The system of claim 1, further adapted to scale said PCM output width and number of banks at design stage based upon said PU2 throughput requirements.

12. The system of claim 1, further adapted to scale said PCM line size at design stage based upon the input data block size.

13. The system of claim 1, further adapted to scale said SCM line size at design stage based upon said external memory burst size.

14. The system of claim 1, further adapted to scale the number of said SCM banks at design stage based upon the required rate of said PCM update.

15. The system of claim 1, further adapted to distribute data in said PCM and said SCM based upon the least significant bits of the memory addresses of the input data blocks.

16. The system of claim 1, further generating sufficiently large SCM control queues based on identifying required data blocks and determining whether the data are present in said PCM, in order for said SCM to access data in said external memory sufficiently earlier than they are needed for processing by said PU2.

17. The system of claim 16, further generating sufficiently large PCM control queues based on identifying required data blocks and said SCM control queues to store abstracted data in said PCM in advance of the data being required by said PU2.

18. The system of claim 1, further reading input data from multiple banks of said SCM simultaneously in a preset number of clock cycles and abstracting said external memory data organization from the cache data organization to hide the external data organization from said PU2 to speed up data processing in said PU2.

19. The system of claim 1, further synchronizing the arrival of data and control parameters in said PU2 to achieve cache coherency.

20. A system for cache structure and management, comprising:
an external memory storing two-dimensional digital image data;
a geometry engine, the geometry engine transmitting control parameters of the digital image data, the control parameters including coordinate transform parameters;
a filter engine, the filter engine processing the digital image data;
a cache system coupled to the external memory, the geometry engine, and the filter engine, the cache system performing digital image processing of the image data with simultaneous coordinate transformation, wherein the cache system comprises:
a primary cache memory coupled to the filter engine; and
a secondary cache memory coupled to the external memory, wherein:
the secondary cache memory has a higher storage capacity than the primary cache memory;
the secondary cache memory has a plurality of banks, each of the plurality of banks having a plurality of storage lines, and the sizes and numbers of the banks and storage lines are optimized based on an input block data structure and a required throughput;
the primary cache memory has a lower storage capacity than the secondary cache memory;
the primary cache memory is faster than the secondary cache memory;
the primary cache memory has a plurality of banks, each bank having a plurality of storage lines, and the sizes and numbers of the banks and storage lines are optimized based on the input data block structure, the read format of the external memory, and the required throughput;
a block inclusion stage coupled to the first processor, the block inclusion stage receiving the control parameters and determining which blocks of data are to be processed;
a first cache control stage coupled to the block inclusion stage, and a second cache control stage, the first and second cache control stages providing control logic for handling data transmitted to the primary cache memory;
a first and second control queue, the first and second control queues providing logic related to data stored in the primary cache memory and the secondary cache memory;
a block generation stage coupled to the secondary cache memory, the block generation stage receiving data stored in the secondary cache memory, and reformatting the received data into a format which is readable by the second processing unit; and
a block queue, the block queue providing logic for fetching data stored in the block generation stage and transmitting the fetched data to the primary cache memory.

21. A method for fetching cached two-dimensional video image data from a cache, the cache being coupled to an external memory, a first processing unit, and a second processing unit, and the cache including at least a primary cache memory and a secondary cache memory, the method comprising:
determining if the data is present in the primary cache memory, wherein:
if the data is present in the primary cache memory,
writing an entry into a primary control queue, transmitting an address of the data stored in the primary cache memory to the second processing unit, and, at the second processing unit, reading the data stored at the transmitted address of the primary cache memory; and
if the data is not present in the primary cache memory,
deciding which storage line of the primary cache memory to replace, writing an entry into the primary control queue, and transmitting an address of the data to be stored in the primary cache memory to the second processing unit, the address corresponding to the storage line of the primary cache memory which will be replaced; and determining if the data is present in the secondary cache memory, wherein:

if the data is not present in the secondary cache memory, deciding which storage line of the secondary cache memory to replace, sending a read request to the external memory, and reading data from the external memory into the secondary cache memory; and if the data is present in the secondary cache memory, writing an entry into a secondary control queue;

reading data stored in the secondary cache memory into a block generation stage;

reformatting and uncompressing the data;

generating a data block for storing in one storage line of the primary cache memory;

writing the generated data block into a block queue;

writing the queued generated data block into storage banks of the primary cache memory; and at the second processing unit, reading the data stored at the transmitted address in the primary cache memory.

* * * * *